Oct. 25, 1960 G. W. YARBER 2,957,659
PRESSURE MODULATED SKID-PREVENTING AIRPLANE
LANDING WHEEL BRAKE CONTROL APPARATUS
Original Filed March 27, 1951 2 Sheets-Sheet 1

INVENTOR.
GORDON W. YARBER

BY

ATTORNEYS

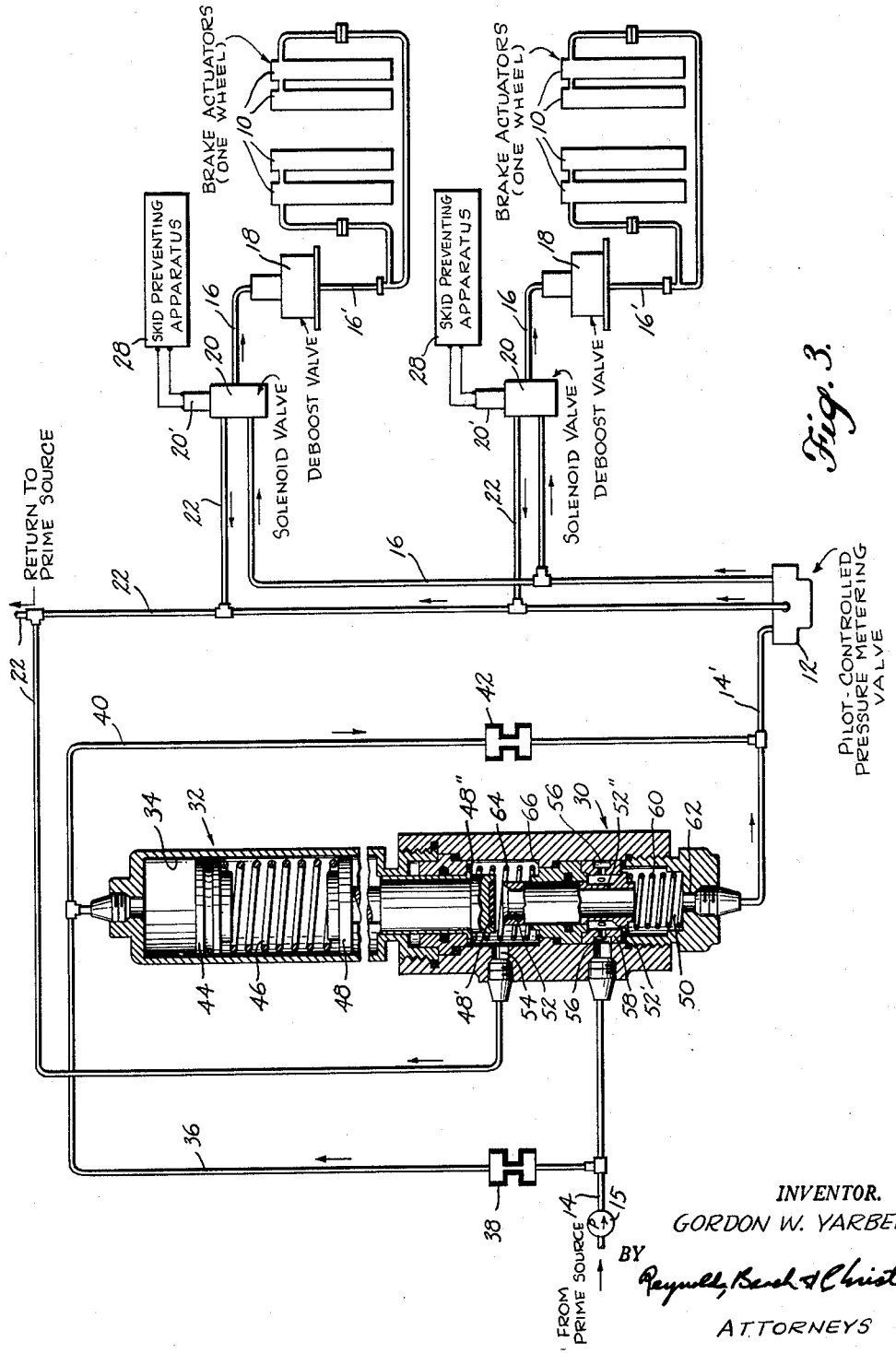

United States Patent Office 2,957,659
Patented Oct. 25, 1960

2,957,659

PRESSURE MODULATED SKID-PREVENTING AIRPLANE LANDING WHEEL BRAKE CONTROL APPARATUS

Gordon W. Yarber, Cornell, Calif., assignor to Boeing Airplane Company, Seattle, Wash., a corporation of Delaware Continuation of abandoned application Ser. No. 217,700, Mar. 27, 1951. This application Mar. 11, 1958, Ser. No. 720,795

10 Claims. (Cl. 244—111)

This invention concerns automatic brake control systems and its general object is to enable stopping an airplane smoothly in the shortest distance attainable without appreciable skidding of the landing wheels due to excessive brake pressure. The present application is a continuation of application Serial No. 217,700, filed March 27, 1951, now abandoned.

Automatic skid-preventing apparatus was described in my Patent No. 2,631,696, issued March 17, 1953, and an improvement thereon in Patent No. 2,636,700 issued April 28, 1952. The present invention as herein illustratively described by reference to its preferred form incorporates skid-preventing apparatus of that general type and certain additional control means in combination therewith to provide a smoother and more efficient automatically controlled braking action than was previously attainable.

During normal operation of skid-preventing apparatus of the type described in said patents, as long as the pressure being metered by the pilot's control valve exceeds that sufficient to initiate skidding of the wheel, a pulsating braking action takes place. This is the result of the cyclical removal and restoration of brake pressure in response to skidding of the wheel and subsequent acceleration thereof toward running speed, respectively. During the early portion of the landing run such pulsations of retarding efforts are not particularly objectionable or noticeable since they then occur at relatively small amplitude, with the airplane, still traveling at high speed, being largely airborne. However, as the airplane speed progressively decreases and its weight is transferred increasingly from the wings to the wheels the latter are capable of correspondingly greater traction on the runway. Thus the wheel brakes become proportionately more effective to retard the airplane. Consequently the pulsating action of the skid-preventing apparatus mentioned above becomes increasingly noticeable as the landing run progresses and can become of such amplitude that the entire airplane structure is shaken. In some instances this may be structurally undesirable as well as causing discomfort to the passengers and crew.

It is also evident that the intermittent reductions of brake pressure below normal to interrupt skidding results in an average effective braking effort which is below the maximum value obtainable were it possible to maintain a steady brake pressure keeping the wheel just on the verge of skidding.

A particular object of the present invention is to minimize the occurrence of the described pulsating action without lowering the braking efficiency of the system nor impairing the capacity of the skid-preventing apparatus to operate if conditions so require. The invention provides an improved brake control system operable to maintain brake pressure at the maximum usable value, i.e., just below skid-producing pressure, to retard the airplane at a maximum rate throughout most of the landing run and especially the latter portion thereof.

A broad object of the invention is an automatic brake control system operable to establish brake pressure at a value just slightly below that sufficient to produce skidding of the wheel in the early portion of the landing run and thereafter operable to progressively increase the brake pressure at a rate proportional to the progressive increase of weight load borne by the wheel during the ensuing portion of the landing run.

Still another object is an automatic brake control system accomplishing the foregoing objects with negligible increase in the weight, cost or complexity of a system already incorporating skid-preventing apparatus of the general type previously mentioned. The present invention utilizes in unique manner the pulsating or intermittent operation of the skid-preventing apparatus to establish initially the brake-applying pressure at a value placing the wheel just on the verge of skidding, as a sort of indexing operation, following which such brake-applying pressure may be increased at the desired rate by other means in the system as mentioned. The improved brake control system incorporating such skid-preventing apparatus accomplishes with unique accuracy the initial pressure establishing operation by reducing the pressure in the hydraulic system by progressive increments and, in effect, after each such incremental reduction, automatically testing the need for further reductions, until a pressure, just below the skidding pressure, is finally reached. It is of course an object to establish such correct initial pressure as rapidly as possible so that the desired condition of nonpulsating maximum braking effort may be obtained as early as possible in the landing run.

Accordingly the invention broadly comprises an airplane landing wheel brake control system including a first agency to establish the brake-applying pressure initially at a value just below that sufficient to skid the wheel, and another agency operable thereafter to effect progressive increase of such pressure at an inherent rate approximately proportional to the rate of increase of weight load borne by the wheel as the particular airplane decelerates during the landing run.

An important feature of the invention in its preferred form as herein described comprises the use of pressure-reducing apparatus capable of reducing brake-applying pressure in the system by progressive increments, in conjunction with skid-detecting operation, until the desired initial pressure is established. Thus the first agency mentioned above preferably comprises skid-preventing apparatus of the general type described in the above-cited patents and means in the system cooperating with such apparatus to reduce the brake-applying pressure in response to cyclical operation of such skid-preventing apparatus.

Another important feature of the invention is the interposition of flow restricting means in the hydraulic system between the prime source of pressure and a storage chamber, the pressure in which establishes or represents brake-applying pressure of the system. Such a flow restricting means serves two functions, one being to permit a rapid progressive reduction of brake-applying pressure by repeated operations of the skid-preventing apparatus and commensurate consumption of pressure fluid, by effectively isolating said storage chamber from the prime source during the pressure reducing period, and the second function being to establish the inherent rate of increase of storage chamber pressure, hence system pressure thereafter by permitting flow from the prime source into such storage chamber at the selected or desired rate.

In the first illustrated form of the invention, the storage chamber mentioned above comprises a pressure fluid accumulator having a storage capacity sufficient to operate the brakes one or more times until the brake applying pressure is reduced to the desired initial value. The flow restrictor is interposed between the prime source and such accumulator to permit accumulator pressure to be reduced by a succession of brake applications through cyclical operation of the skid-preventing apparatus.

In the second illustrated form of the invention the storage chamber contains a piston or other pressure responsive means arranged to control the setting of a pressure regulating valve interposed in the delivery conduit between the prime source and the remaining portions of the hydraulic system. In this case the flow restrictor is located in a conduit affording communication between the delivery conduit on the upstream side of the pressure regulating valve, and said storage chamber. Communication between such storage chamber and the downstream side of the pressure regulating valve is also afforded to permit progressive reduction of chamber pressure, hence brake applying pressure in the system, during cyclical operation of the skid-preventing apparatus, as before. In this form of the system no pressure fluid accumulator is required to supply operating fluid to the brake actuators.

These and other features, objects and advantages of the present invention will become more fully evident from the following detailed description of its two illustrated and preferred forms based on the accompanying drawings.

Figure 3 is a schematic diagram of a brake control system embodying the present invention in a modified form.

Figure 1:
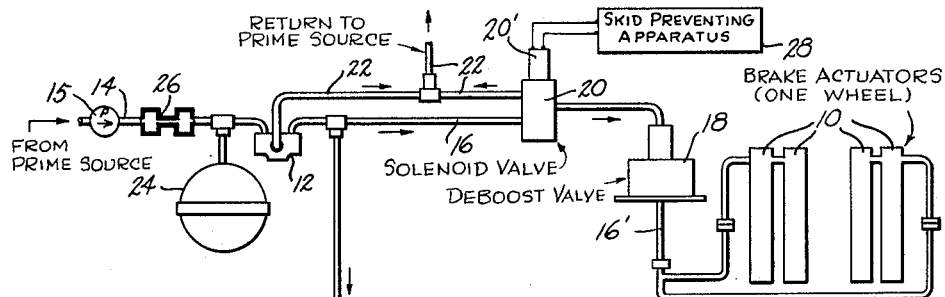
Figure 1 is a schematic diagram of a brake control system embodying the present invention in its first and most preferred form.

In most large airplanes the right and left rudder pedals are arranged and adapted to control the right and left wheel brakes as well as the rudder mechanism. As a result the airplane may be steered on the ground either by rudder control, by brake control or by a combination of the two through proper application of the pedals. The system illustrated in Figure 1 is that associated with one of the rudder pedals in an airplane of that type, and more specifically one having a dual wheel landing gear under each wing, requiring two sets of brake actuators 10 for each such landing gear. The pilot-controlled metering valve 12 interposed in the hydraulic system is of the conventional pedal-actuated type normally enabling the pilot to establish the hydraulic pressure applied to the wheel brakes. It will be understood that in the complete airplane of the type mentioned above, there will be another system similar to that appearing in Figure 1, to control the other dual wheel landing gear brakes.

In Figure 1, brake operating fluid is pumped under high pressure (such as about 3000 pounds per square inch) from a pump or other prime supply source (not shown) to the pilot-controlled metering valve 12 through a delivery conduit 14. Although the pump delivers a substantially constant pressure, the setting of the metering valve 12 which the pilot establishes by foot pressure on the rudder pedals determines the actual pressure of fluid passing into and through a connecting conduit 16 into a deboost valve 18. In conventional manner the latter transforms the flow in conduit 16 from a high pressure, low volume flow to a relatively low pressure, high volume flow in conduit 16', the latter interconnecting the deboost valve and the brake actuators 10. A normally open solenoid-actuated anti-skid valve 20, controlled by skid-preventing apparatus 28 as hereinafter explained, is interposed in connecting conduit 16. When the valve's solenoid 20' is energized, the valve blocks the conduit 16 and releases pressure in the brake actuators 10 by permitting discharge therefrom into the return conduit 22. The construction of such a three-way anti-skid valve, as such, forms no part of the present invention, and, as it may be of any suitable or conventional type, is not illustrated in the drawing.

An accumulator 24 of the conventional type incorporating a rubber diaphragm or the like, to store and deliver fluid under pressure, communicates with the delivery conduit 14 as shown.

In the usual brake control system, for the moment ignoring the anti-skid valve 20, when the airplane touches the ground and the pilot operates the metering valve 12 to apply the wheel brakes an initial surge of hydraulic fluid through the conduit 16 and 16' is required to operate the brake actuators 10. The accumulator 24 helps to maintain a high pressure at the inlet side of the metering valve 12 during this transitory condition by preventing a drop in pressure at the inlet to such valve because of resistance to flow of the hydraulic fluid in the delivery conduit 14. In the usual system any such discharge from the accumulator 24, which insures quick application of the brakes, is replaced almost immediately, that is in a very small fraction of a second, by flow through the delivery conduit 14.

In accordance with the present invention, however, a flow restrictor 26 is interposed in the delivery conduit 14 between the accumulator 24 and the prime source of hydraulic pressure (not shown). The presence of this flow restrictor and the anti-skid valve 20 controlled by skid-preventing apparatus 28 is to produce an altogether different type of brake operation than any heretofore known or used.

As explained in the above-cited patents, the primary function of the skid-preventing apparatus 28 controlling the anti-skid valve 20 is to detect initiation of wheel skidding due to excessive pressure applied by the metering valve 12, release the brakes automatically thereupon to permit recovery of the wheel speed, then detect the ensuing acceleration of the wheel toward recovery speed and in response to such acceleration reapply the brakes by deenergization of the anti-skid valve solenoid 20'. As long as the pilot continues to meter excessive pressure to the brakes through the valve 12 the skid-preventing apparatus intermittently reverses the position of the anti-skid valve 20 to release and reapply the brakes in pulsating manner. Without the flow restrictor 26 in the conduit 14 the system illustrated in Figure 1 would operate in accordance with the principles set forth in said patents. The presence of the flow restrictor 26 does not alter these principles of operation nor modify the effect of the skid-preventing apparatus 28 basically, as such, but considerably modifies the operation of the brake control system as a whole, as will now be explained.

It is first to be noted that the flow restrictor 26 imposes a very considerable impedance to flow of hydraulic fluid through delivery conduit 14 to the metering valve 12 and accumulator 24. For instance, in a typical brake control system for a large bomber airplane in which the invention may be used, the flow restrictor permits a flow of but 1.25 gallons per minute under a pressure difference of 3000 pounds per square inch. The basis for selection of the restriction in the flow restrictor, as will be explained shortly, depends upon the type of airplane and other factors to be mentioned.

Figure 2:
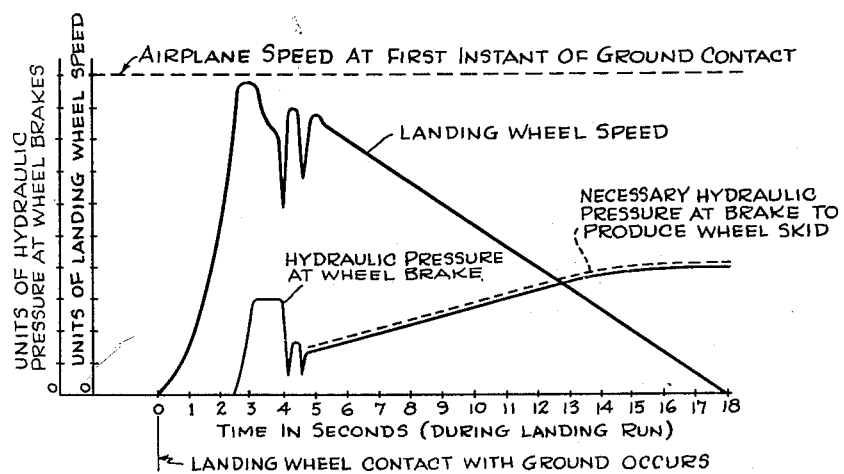
Figure 2 is a graph illustrating operation of such a system.

With reference to Figures 1 and 2, when the airplane touches the ground during landing and the pilot operates the metering valve 12 to apply the brakes by flow of hydraulic fluid through the normally open anti-skid valve 20, there is a discharge from accumulator 24 which lowers its pressure by an increment. If, as shall be assumed, the pressure metered by the valve 12 is excessive, that is, causes the wheel to skid, the anti-skid valve 20 will immediately be actuated to block flow from the metering valve 12 and relieve pressure in the brake actuators 10 by permitting return flow back to the prime source (not shown) through the return line 22. Relieved of braking force the airplane wheel will then under normal conditions quickly accelerate toward running speed. When it actually approaches running speed, the anti-skid valve will again be reversed to effect reapplication of pressure to brake actuators 10, in accordance with principles of operation set forth in said patents.

During the period between such successive applications of operating pressure to the brake actuators, the initial brake-applying discharge from the accumulator 24 which lowered its pressure by an increment is being replaced by flow through the delivery conduit 14 and flow restrictor 26. However, such replacement flow occurs at such a slow rate that before it results in any appreciable increase of pressure in the accumulator, the second brake application occurs and accumulator pressure is reduced by another increment. In a typical case the period of time between such successive brake applications, as illustrated in Figure 2, will be a matter of a second, more or less, the actual interval being of secondary importance. The cycle of operation repeats itself until, by progressive increments, the pressure in accumulator 24 is reduced to a point just below that sufficient to produce wheel skidding. In Figure 2, two applications and interruptions of brake pressure to actuators 10 were necessary to reach that result, although it will be understood that the principle is the same even though a different number of operating cycles may be required in different instances to index the system to the proper initial pressure. A quick-responding skid-preventing apparatus insures that such indexing will take place rapidly under normal landing conditions, as desired.

Following the initial indexing or pressure establishing operation of the system, which is executed in a very short time during the early phase of the airplane's landing run when the attendant brake pulsations are not objectionable, the system next enters a pressure recovery phase, which in the ideal case lasts for the duration of the landing run and eliminates the necessity for any further operations of the skid-preventing apparatus even though the metering valve 12 may be held in its original setting by the pilot. In this latter phase of operation accumulator pressure is permitted to rise slowly by flow pumped from the prime source (not shown) through the flow restrictor 26. The size of the restriction in such flow restrictor is selected to permit a rate of increase which under assumed normal conditions equals the rate at which the braked wheel is able to receive increased brake pressure without skidding, that is in proportion to the rate of transferral of the airplane weight from the wings to the wheels during the remaining portion of the landing run. Depending upon a number of variables, the size of the flow restrictor 26 may differ in different installations. For a particular airplane the selection of the flow restrictor 26 is based upon the assumption that the airplane will be carrying maximum expected load during landing and that it will land on a dry concrete runway, which is merely to say a runway having the highest coefficient of friction which may be encountered. As shown in Figure 2, the rate of increase of brake-actuating pressure, being approximately linear, will then maintain the braking effort at its maximum value below skid-producing pressure. Of course, as the airplane's speed drops to a certain point, substantially all of its weight will be borne by the wheels and no further reductions in speed will change the value of brake pressure which produces wheel skidding. Thus the curve of braking-actuating pressure sufficient to produce skidding actually flattens out during the last portion of the landing run. The companion curve of actual pressure at the brakes will also tend to flatten out either at a value corresponding to the pressure setting of metering valve 12 or at a value corresponding to maximum attainable accumulator pressure if the pressure setting of the metering valve exceeds such maximum attainable accumulator pressure. After having had some experience with operating the system the pilot may find it desirable to make some adjustment in the setting of the metering valve 12, after its initial setting, especially during the final phases of the landing run, although the system may be so designed that the pilot's responsibility is substantially that merely of setting the metering valve 12 at an initial pressure, such as its maximum setting, appreciably above that sufficient to skid the landing wheels initially, and holding that setting, or reducing it if necessary to prevent excessive pressure rise near the ned of the landing run.

Once the size of the flow restrictor is selected in accordance with the foregoing assumed conditions the rate of pressure increase of the accumulator, which may be correct for the extreme, although normal, case of a dry concrete runway will be excessive for a comparatively slippery runway. The only effect of that circumstance is to require that the indexing or pressure establishing phase of operation of the system be repeated once or more during the landing run, as the brake-actuating pressure tends to rise above the critical skid-producing value. A similar result would obtain in the case of landing with a relatively light load in the airplane.

By experience in landing under such abnormal conditions the pilot can learn to control the metering valve 12 to produce substantially maximum braking effort while at the same time increasing the interval which would otherwise exist between successive groups of braking pulsations. His effort in that connection would be to vary the pressure setting of the valve 12 to maintain its called-for pressure at a value below accumulator pressure but not appreciably below skid-producing pressure. In cases of very restricted landing space, the pilot would probably not wish to attempt controlling the valve 12 in order to minimize the recurrence of operation of the skid-preventing apparatus, as he could then not afford to chance reducing the braking effort below maximum attainable value. However, in cases of overly ample landing space he would be in position to control the valve 10 in an effort to reduce the necessity for repeated operations of the skid-preventing apparatus without appreciably reducing braking efficiency.

It will be noted, however, that commercial airplane landing conditions do not ordinarily vary greatly from the assumed normal conditions mentioned herein and are becoming increasingly standardized as the industry of air transportation advances. It is possible, therefore, to design a particular system of the type herein described which will provide optimum performance, that is maximum braking effort with minimum recycling of the skid-preventing apparatus, in the majority of landing runs.

It should also be noted that the selection of the flow restrictor 26 if made on the basis just described will automatically be correct for purposes of the indexing phase of system operation. That is, it will be a sufficient restriction to enable a pressure reduction in the accumulator during repeated operations of the skid-preventing apparatus, as, for that purpose, such flow restrictor will substantially isolate the accumulator from the prime source to be connected to delivery conduit 14.

In essence, therefore, the invention basically comprises a brake control system in which the pressure exerted on the brake actuator is subjected to two oppositely acting influences. One is a rapidly acting and overriding influence, which is to reduce the brake pressure progressively in response to and during skidding of the wheel, until the brake pressure reaches a reduced value too low to produce further skidding. This action is attained in Figure 1, for example, by a first pressure determining means comprising the skid-detecting apparatus 28 acting through the solenoid valve 20 and return line 22 in order to rapidly reduce pressure in the conduit system including conduit 16 and accumulator 24 during prolonged wheel skidding causing recurrent opening and closing of valve 20, the effect of which is to progressively drain the accumulator. The second such influence is the relatively slow-acting subordinate influence by which brake pressure is slowly increased from any such reduced value toward a predetermined upper value at a predetermined rate corresponding approximately to the rate of increase of brake actuator pressure necessary to skid the wheel during the ensuing portion of the landing run as weight load of the airplane is transferred progressively from the wings to the wheels thereof. This second action, which becomes effective only when not being overridden by the first described action, is attained in Figure 1 by a second pressure determining means comprising the pressure source pump 15 and the flow restrictor 26 through which pressure is gradually restored or increased in the conduit system including conduit 16 and accumulator 24 at a predetermined rate determined by the restricting effect of the restrictor 26. In effect, therefore, the conduit system 16, 24 functions as a brake operating means by which pressure is applied to the actuator, and the pressure which is actually so applied is determined by two oppositely acting control influences as described above.

In the modified form of the system illustrated in Figure 3 the pressure fluid accumulator 24 and flow restrictor 26, as components of the pressure regulating means, are replaced by a special pressure regulating valve mechanism producing results equivalent thereto. Such mechanism includes the automatically controlled pressure regulating valve 30 and automatic control means 32 controlling the pressure setting of said valve and including a storage chamber 34. This storage chamber communicates with delivery conduit 14 through a conduit 36 having a flow restrictor 38 therein, and further with the conduit 14' (between flow regulating valve 30 and pilot-controlled metering valve 12) through a conduit 40 having a flow restrictor 42 therein.

The pressure of fluid inside storage chamber 34 acts against the end of a piston 44 slidable in such chamber. A relatively stiff compression spring 46 seated against a slidable valve control element 48 is compressed between the piston 44 and the element 48 under a force equal to the product of the pressure inside storage chamber 34 and the effective area of the piston end face therein. The pressure applied to the valve control element 48 by the spring 46 is opposed by pressure in the regulating valve outlet 50 passing through the hollow interior of valve sleeve 52 and acting against the control element end face 48' opposite such spring.

The regulating valve housing inlet 56 is connected to the delivery conduit 14. A conically tapered shoulder 52' on the lower end of the longitudinally slidable valve sleeve 52 is adapted to seat against the lower rim of the grooved, apertured ring 58. Pressure fluid from conduit 14 passes into the ring's groove and through its apertures into the annular space within such ring immediately surrounding the reduced sleeve portion 52" located just above such tapered shoulder. A light compression spring 60 received against a shoulder 62 in the outlet chamber 50 tends to seat the conically tapered shoulder 52' against such ring and thereby tends to block flow from conduit 14 into the regulating valve outlet. Another compression spring 64 is received between a shoulder 48" of the valve control element 48 and a fixed shoulder 66 in the valve housing to urge the valve control element upwardly, although the stiffness of this spring is much less than that of spring 46. The lower end of the valve control element (48') adjacent the upper end of the valve sleeve 52 has an inset of a material such as rubber or leather against which such sleeve end may seat at times and form a seal against loss of pressure fluid from the outlet chamber 50 to the return line through the return line chamber 54.

The construction and functioning of the pressure regulating valve 30 is or may be the same as a conventional type of pilot-controlled brake pressure metering valve (corresponding to valve 12), in which the pressure of a control spring, corresponding to the spring 46, establishes the pressure metered to the brakes in a conventional aircraft brake operating system of the hydraulic type. However, in the present application of such a pressure metering valve 30, pressure of fluid in the storage chamber 34 instead of pressure established by the manual effort of the pilot establishes the output pressure from the valve. Thus the regulated pressure entering the conduit 14' is automatically maintained substantially equal to the instantaneous pressure in the storage chamber 34.

If conditions are quiescent in the system, as they will be just prior to landing the airplane, hydraulic pressure in the storage chamber 34, hence in the regulating valve outlet 50, will be substantially equal to the maximum pressure in the system (3000 pounds per square inch in the example).

When the pilot operates the metering valve 12 to apply the brakes there will be an immediate surge of hydraulic fluid into and through the conduit 14' from the regulating valve outlet 50 which will at once unseat the valve shoulder 52' and cause an immediate reduction of pressure acting against the valve control element's lower end 48', both because of flow to the brake actuators and because of flow through sleeve 52 into the return line, between the sleeve's upper end and the control element's lower end 48'. As the pressure in storage chamber 34 is then at the maximum, piston 44 is urged downward slightly and valve control element 48 by a somewhat greater amount, because of the slight expansion of the spring 46 now under somewhat reduced pressure. Such downward shifting of control element 48 is a pressure regulative movement which tends to raise pressure in the outlet 50 of valve 30 to that in chamber 34 by restricting the space between control element end face 48' and the valve sleeve 52.

During continuation of flow through the regulating valve and into conduit 14' as the hydraulic brakes are being moved into braking position, there is a progressive drop of pressure in storage chamber 34 by outflow through restrictor 42 into conduit 14', and a corresponding progressive drop in pressure inside that conduit because of the regulating action of the valve 30 controlled by piston 44 and spring 46 in accordance with storage chamber pressure. This progressive drop in storage chamber pressure is possible because the flow restriction in the restrictor 38 is greater than the restriction in the restrictor 42 and therefore prevents replacement of discharge from the storage chamber 34 as fast as it takes place through the restrictor 42. Such progressive drop of pressure inside chamber 34, hence in the conduit 14', continues during a fraction of a second, until the wheel brakes are at full pressure hence demand no more fluid for the time being from the supply source. Thereupon the incrementally lowered pressure in chamber 34, hence at the outlet 50 of the regulating valve remain substantially constant, subject only to the gradual rise of pressure at a very slow rate by replacement flow through the flow restrictor 38. Before the increase of pressure in chamber 34 due to such replacement flow can become appreciable under normal circumstances the wheel, overbraked, will commence to skid, and the skid-preventing apparatus 28 will go into operation to release the brakes and subsequently to cause their reapplication. At the latter time another surge of hydraulic fluid through the regulating valve 30 will be required which will cause an additional incremental drop of pressure in the storage chamber 34 hence in the outlet 50 of such valve, as before.

Consequently a succession of brake applications caused by cycling of the skid-preventing apparatus 28 reduces the pressure at the inlet of the metering valve 12, hence at the brakes, by progressive increments, as in the previously described form of the invention, until the point is reached at which the next application of the brakes occurs at a pressure which is just below that sufficient to cause the skidding of the wheel. Thereupon pressure in the storage chamber 34 gradually increases by flow from the delivery conduit 14 at a rate established by the impedance of the flow restrictor 38. The accompanying progressive advance of the valve control element 48 toward the upper end of the valve sleeve 52 to cut off the return flow therebetween causes a corresponding progressive increase in pressure at the outlet 50 of the regulating valve. The rate of increase thus established by the flow restrictor 38 is selected in accordance with considerations previously described, so that an equivalent type of operation is obtained with the modified form as in the earlier described form.

In selecting the size or capacity of flow restrictors 38 and 42 is to be noted that the latter will have a relatively large flow capacity and the former a relatively small one to enable the pressure in the storage chamber 34 to be reduced by the desired incremental amount during each surge of brake fluid through the metering valve 12. The actual amount of incremental reduction desired in the normal case will be such that brake pressure will be reduced to the desired initial pressure in a few cycling operations of skid-preventing apparatus 28. The desired rate of pressure increase in the system after the initial indexing or pressure establishing operation dictates the selection of capacity of the restrictor 38.

Figure 4:
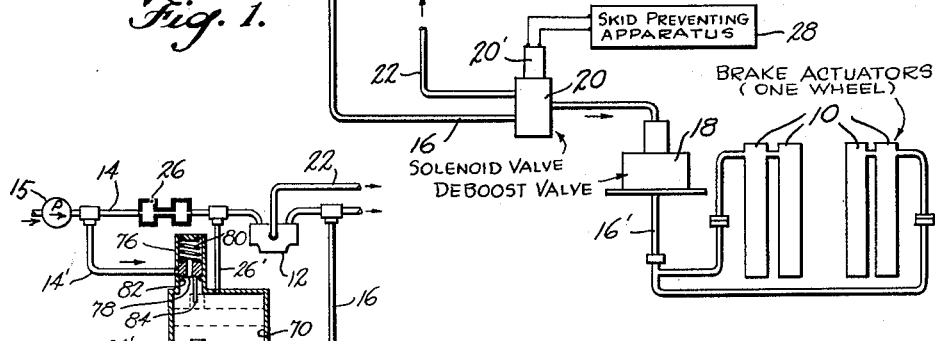
Figure 4 illustrates a modification of Figure 1.

The arrangement of Figure 4 comprises a modification of the pressure regulating means of the system of Figure 1, corresponding parts bearing similar numerals. Its purposes is to prevent accumulator pressure dropping below a selected minimum value such as 100 pounds per square inch, for example, should, under extremely slippery landing conditions, the skid-preventing apparatus recycle an unusually large number of times. For instance, should the landing wheel encounter an extremely icy and slippery runway surface, causing progressive degeneration of accumulator pressure by a relatively long succession of brake applications, the system of Figure 1 might be incapable of restoring brake pressure quickly enough, as a result of the impedance of flow restrictor 26, when the wheel reaches a less slippery surface, or is otherwise capable of receiving greater braking force without skidding. The modification appearing in Figure 4 includes the provision of special valve mechanism insuring that accumulator pressure can never drop below the value mentioned above, which is sufficient at least to move the brake actuators through their initial travel necessary before brake pressure can be increased at an effective rate.

In Figure 4 the accumulator 24' comprises a cylinder 70 cooperating with the piston 72 received therein, and a spring 74 urging such piston upwardly against downward pressure of fluid in the accumulator chamber above the piston. A conduit 26' interconnects such accumulator chamber and conduit 14 at a location in the latter between flow restrictor 26 and metering valve 12, to permit flow into the accumulator through such flow restrictor and discharge from the accumulator into conduit 16, as in Figure 1.

Mounted on the upper end of accumulator cylinder 70 is a cylindrical valve housing 76 in registry with an aperture in the top wall of such cylinder. A side opening in the valve housing permits admission of high pressure fluid from branch 14' of delivery conduit 14, when such opening is not blocked off by valve element 78. A downwardly acting spring 80 inside such valve housing normally holds the valve element against a fixed shoulder 82, in position to block admission of fluid into the valve housing through its side opening. A pin 84 projecting downwardly from the valve element 78 is positioned in alignment with a post 86 projecting upwardly from the piston 72, such that upward movement of the piston during decrease in accumulator pressure ultimately permits engagement between such pin and post. Thus if accumulator pressure drops below a selected point, represented by the residual compression of spring 74, when the post 86 engages the pin 84, an additional decrease of accumulator pressure will shift the pin and thereby the valve element 78 upwardly to admit high pressure fluid from branch conduit 14' into the accumulator chamber and forces the piston 72 downwardly until valve element 78 again blocks the side opening in the valve housing 76, and cuts off the admission of such high pressure fluid. Thus the valve mechanism associated with the accumulator maintains pressure in the latter above a minimum selected value sufficient to displace the brake actuators into operating position so that when the wheel is ready to receive appreciable braking force the slow inflow of fluid permitted by flow restrictor 26 may be used more immediately for that purpose, rather than for the preliminary operating position. As a result, brake pressure increase is obtained more rapidly under these conditions than it might be otherwise.

It will be evident that a similar modification could be made to the system appearing in Figure 3, to prevent pressure in storage chamber 34 dropping below a selected minimum value, so that pressure source output pressure would remain above such value, if desired.

Another noteworthy aspect of the design of systems embodying the present invention is that the flow restrictors 26, 38 and 42 are preferably of the sharp-edged orifice type. As such, their flow impedance is virtually independent of changes of viscosity of the hydraulic fluid attendant on temperature changes thereof, and the system is thereby made to operate consistently over a wide range of ambient temperature variation.

I claim as my invention:

1. Airplane landing wheel brake control apparatus comprising in combination with a fluid pressure operated wheel brake actuator, a high pressure fluid source, conduit means interconnecting said source and said actuator for delivering high pressure fluid to the actuator, pressure-controlling valve means interposed in said conduit means between said actuator and said source operably to permit varying the fluid pressure applied to said actuator, said source delivering fluid under pressure sufficiently high to produce wheel skidding when permitted by opening of said valve during the airplane's landing run, skid preventing means of the type including a second valve means interposed in said conduit means between said source and said actuator and operable to interrupt and restore fluid pressure application to said actuator, and apparatus connected to said second valve means and automatically operating the same to interrupt said fluid pressure application to said actuator in response to initiation of wheel skidding and to restore such fluid pressure application thereafter upon skid termination, and means, including a pressure-accumulating fluid storage chamber, regulating pressure in said conduit means ahead of said two valve means in accordance with pressure in said storage chamber, said storage chamber being connected to said conduit means between said source and said first valve means to receive high pressure fluid from said conduit means when fluid pressure in said storage chamber is below that in said conduit means and to deliver high pressure fluid to said conduit means when fluid pressure in said storage chamber is above that in said conduit means, said pressure regulating means also including flow restricting means interposed in said conduit means between said source and said storage chamber and having a flow restricting effect limiting flow of fluid to said storage chamber at a predetermined rate materially below the rate of discharge of fluid from said storage chamber during said fluid pressure applications to said actuator, whereby pressure in said chamber is reduced by progressive increments during cyclical operation of said skid-preventing means in response to recurrent skid initiation and termination until such latter pressure reaches a reduced value too low for initiating further wheel skidding, said flow restricting effect produced by said restricting means limiting rate of flow to said storage chamber at a rate permitting pressure increase therein from said reduced value at a rate corresponding approximately to the rate of increase of brake actuator pressure necessary to skid the wheel during the ensuing portion of the landing run as weight load of the airplane is transferred progressively from the wings to the wheels.

2. The combination defined in claim 1, wherein the pressure-accumulating storage chamber has a sufficient fluid volume capacity and is capable of discharging fluid under pressure at a rate sufficient to operate the brake actuator substantially solely by discharge from said storage chamber.

3. The combination defined in claim 1, wherein the pressure regulating means further includes a pressure regulating valve serially interposed in the conduit means between the source and the two first-mentioned valves and operable to vary the fluid pressure in said conduit means, and a second flow-restricting means, the pressure-accumulating storage chamber being connected to the conduit means ahead of said pressure regulating valve through the first flow restricting means and being connected to the conduit means behind said pressure regulating valve through the second flow restricting means, said second flow restricting means presenting a materially lesser restriction to flow therethrough than the flow restriction of the first flow restricting means, and means responsive to pressure in said storage chamber and operatively connected to said pressure regulating valve to vary the pressure in said conduit means in accordance with variations in said storage chamber pressure.

4. The combination defined in claim 1, wherein the pressure regulating means includes means preventing reduction of storage chamber pressure below a predetermined minimum pressure.

5. The combination defined in claim 3, wherein the last-mentioned means includes a by-pass flow connection between the storage chamber and the conduit means ahead of the first flow restricting means, a normally closed valve interposed in said by-pass connection and means responsive to pressure in said storage chamber and operatively connected to said latter valve for opening the same automatically in response to a reduction of storage chamber pressure below said minimum pressure.

6. Airplane landing wheel brake control apparatus comprising in combination with a fluid pressure operated wheel brake actuator, a high pressure fluid source, conduit means interconnecting said source and said actuator for delivering high pressure fluid to the actuator, valve means interposed in said conduit means between said actuator and said source operably to permit applying and removing fluid pressure to and from said actuator, said source delivering fluid under pressure sufficiently high to produce wheel skidding when permitted by opening of said valve means during the airplane's landing run, said valve means having a return connection for relieving pressure in said actuator by closing of said valve means, skid-detecting apparatus connected to said valve means and automatically closing the same to interrupt said fluid pressure application to said actuator in response to initiation of wheel skidding, and opening said valve means to restore such fluid pressure application thereafter substantially upon skid termination, and pressure regulating means interposed in said conduit means between said valve means and said source, including storage means to store fluid carried by said conduit means, and to deliver it to said actuator with each opening of said valve means, and further including flow restrictor means interposed serially in said conduit means between said storage means and said source, said flow restrictor means having a flow restricting effect limiting flow from said source at a rate materially below the effective rate of delivery of fluid from said storage means to said actuator during rapidly recurrent openings of said valve means, whereby pressure in said storage means is reduced by progressive increments during cyclical operation of said skid-detecting apparatus in response to rapidly recurrent wheel skid initiation and termination until such latter pressure reaches a reduced value too low for initiating further wheel skidding, said flow restricting effect limiting flow to said storage means at a rate permitting pressure increase therein from said reduced value at a rate corresponding approximately to the rate of increase of brake actuator pressure necessary to skid the wheel during the ensuing portion of the landing run as weight load of the airplane is transferred progressively from the wings to the wheels thereof.

7. Airplane landing wheel brake control apparatus comprising in combination with a fluid pressure operated wheel brake actuator, a high pressure fluid source, conduit means interconnecting said source and said actuator for delivering high pressure fluid to the actuator, valve means interposed in said conduit means between said actuator and said source operably to permit applying and removing fluid pressure to and from said actuator, said source delivering fluid under pressure sufficiently high to produce wheel skidding when permitted by opening of said valve means during the airplane's landing run, skid-detecting apparatus connected to said valve means and automatically closing the same to interrupt said fluid pressure application to said actuator in response to initiation of wheel skidding, and opening said valve means to restore such fluid pressure application thereafter substantially upon skid termination, and pressure regulating means effectively interposed between said valve means and said source, including means operable to reduce pressure in said conduit means at said valve means progressively during operation of said skid-detecting apparatus in response to wheel skidding until such latter pressure reaches a reduced value too low for producing further wheel skidding, said pressure regulating means permitting recovery of such pressure thereafter toward the pressure of said source, from said reduced value, at a rate corresponding approximately to the rate of increase of brake actuator pressure necessary to skid the wheel during the ensuing portion of the landing run as weight load of the airplane is transferred progressively from the wings to the wheels thereof.

8. Airplane landing wheel brake control apparatus comprising in combination with a fluid pressure operated wheel brake actuator system which draws substantially a predetermined quantity of operating fluid from its source with each brake application, means comprising a source of fluid under pressure having an output side connected to supply operating fluid under pressure to said brake actuator system and having a return side connected to receive fluid back from said actuator system and thereby relieve said system of such pressure, electrically actuatable valve means interposed in such connections to open and close the same alternately and oppositely, thereby to apply and relieve pressure in said actuator system by actuation of said valve means, said pressure source means having the characteristic of dropping rapidly in pressure by an incremental amount from the withdrawal therefrom of said quantity of fluid with each actuation of the valve means to apply pressure to the brake-actuator system, and of recovering in pressure relatively slowly during periods between withdrawals of fluid therefrom by the brake-actuator system, and skid-detecting apparatus having an actuating connection to the valve means and instantly responsive to wheel skidding to actuate said valve means for closing the output side connection and opening the return side connection in response thereto, whereby relief of brake-actuating pressure in the brake actuator system terminates such skidding and permits reverse actuation of the valve means to reapply brake-actuating pressure to the actuator system, such skid-responsive actuation of the valve means being rapidly repeated until the resulting accumulative drop of pressure in the pressure source means corresponding to the sum of the incremental drops leaves insufficient pressure to actuate the wheel brake sufficiently to skid the wheel, whereupon the pressure source pressure, and thereby the brake actuating pressure, progressively increases with the brake continuously applied, 9. The apparatus defined in claim 8, wherein the fluid pressure supply means comprises a high pressure fluid source, pressure accumulator means in the connection between said source and said actuator, flow restrictor means interposed in the connection between said source and the pressure accumulator means to restrict the flow of fluid to the actuator from said source, and means controlled by the skid-detecting means operably during wheel skidding for reducing pressure in the pressure accumulator means, hence that applied to the actuator, at a rate materially faster than the rate of recovery thereof by flow from said source through the flow restrictor means, the flow restricting effect of the flow restrictor determining the rate of recovery of pressure thereafter in said pressure accumulator, hence that applied to the actuator, by flow from the high pressure source.

10. Airplane landing wheel brake control apparatus comprising, in combination with a wheel brake actuator, brake operating means operatively connected to said actuator and adapted to apply variable actuating pressure thereto, said brake operating means normally producing an upper value of actuation pressure sufficient to skid the wheel initially during a landing, pressure-restoring means operatively connected to said brake operating means and tending substantially continuously, with actuating pressure below said normal value, to increase such pressure progressively at a relatively gradual rate toward said normal value, and pressure-reducing means controllingly connected to said brake operating means and operable to reduce said pressure, thereby acting to temporarily override such pressure-restoring means, said pressure-reducing means comprising apparatus sensitive to the condition of wheel skidding and being operable thereby to reduce said applied pressure progressively at a relatively rapid rate during continuation of such condition.

No references cited.